April 12, 1932.  B. H. HOPKINS  1,854,140

CABLE GRIPPING DEVICE

Filed June 18, 1930

WITNESSES
Geo. W. Naylor
Chris Feinle.

INVENTOR
Benjamin H. Hopkins
BY
Munn & Co.
ATTORNEYS

Patented Apr. 12, 1932

1,854,140

UNITED STATES PATENT OFFICE

BENJAMIN HARRISON HOPKINS, OF WYMAN DAM, MAINE

CABLE GRIPPING DEVICE

Application filed June 18, 1930. Serial No. 462,026.

This invention relates to rope or cable clamping or gripping devices adapted for attaching a rope or cable to various appurtenances for various purposes.

The invention has for its general object to provide an improved device of the indicated character which may be readily attached to and be detached from a rope or cable, and which will be of efficient and substantial design.

The nature of the invention and its distinguishing features and advantages will appear when the following specification is read in connection with the accompanying drawings, in which Figure 1 is a side view of the device applied to a cable;

Figure 1:
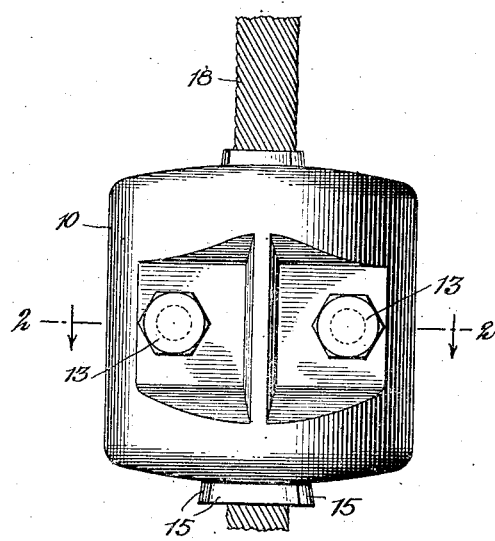
Figure 3:
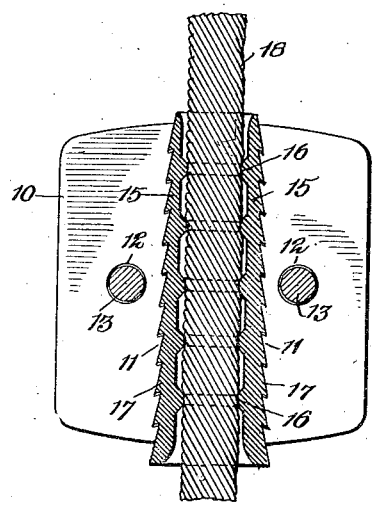
Figure 3 is a section taken on the line 3—3 of Figure 2.
Figure 2:
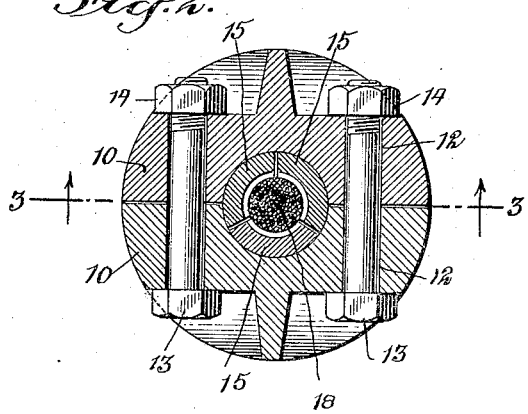
Figure 2 is a section taken on the line 2—2 of Figure 1.
Figure 4:
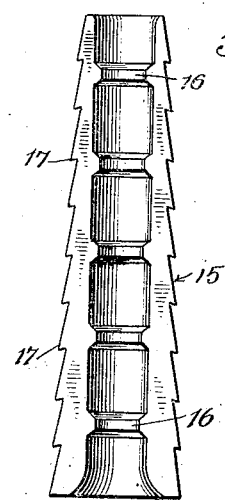
Figure 4 is a side view of one of the gripping sections of the core.

Referring now more particularly to the drawings, it will be apparent that the device includes a pair of similar co-operative clamping members 10 which form a collar, and each of the members 10 constitutes half of the collar. Each of the members 10 has a bore or groove of tapering form having serrations 11 which form transverse ridges. Each of the members 10 has a plurality of holes 12, the holes of one member being registrable with the holes of the other member when the members are brought together, and receive clamping bolts 13 having removable nuts 14, which serve to securely hold the clamping members 10 together. When the clamping members 10 are brought together, the bores therein, together with the serrations 11, constitute a means of tapering form adapted to receive a gripping core forming a part of the device.

The gripping core comprises a plurality of similar tapering gripping sections 15, each of which is of sector shape in cross section, and when brought together form a tubular core or body of tapering form. Each of the gripping sections 15 has ridges 16 on the inside thereof, and serrations 17 on the outside thereof which form transverse ridges corresponding to the ridges presented by the serrations 11 of the clamping members 10.

From the foregoing it will be apparent that a rope or cable 18 may be slipped through the tubular core formed by the gripping sections 15, it being understood that the nuts 14 are loosened in order that the gripping sections 15 will be separated with respect to each other to allow the cable to be slipped therethrough. The nuts 14 of the bolts 13 may then be tightened, thereby drawing the clamping members 10 together in clamping engagement with the gripping sections 15, causing the latter to effectually grip the cable 18. It will be apparent that the ridges 16 of the gripping sections 15 bite into the cable 18, and it will also be apparent that, by reason of the tapering form of the gripping sections 15, they will serve as wedges in conjunction with the clamping members 10 when a pull is exerted on the cable 18 in an upward direction, thereby causing the gripping sections 15 to more tightly grip the cable 18. In this connection it is to be observed that the serrations 17 may ride on the serrations 11, and so force the sections 15 toward each other to increase the grip on the cable, and also prevent the sections 15 being pulled from between the members 10.

From the foregoing it will be apparent that the device described hereinabove will be adjustable and will at all times and under all conditions be held securely in gripping engagement with a rope or cable, and that it may be readily attached to and be detached from the rope or cable.

What is claimed is:

A cable gripping device comprising a pair of clamping members constructed when in clamping relation to form a body having a tapering bore, a plurality of cable gripping core elements fitting within the bore of said body and combining to form a tapering core having a straight axial bore therethrough for the reception of a cable, said core elements having transverse ridges on the inner surfaces thereof to grip the cable; said core elements having tapered and stepped serrations on the outer surfaces thereof which extend entirely around the assembled core, and said body having the walls of the bore thereof formed with complemental inclined and stepped bearing surfaces for engagement with said serrations, whereby said core elements will be allowed to move axially of said body in one direction to exert an increasingly greater grip on said cable, said serrations acting to allow only limited movement of said core elements in the other direction.

BENJAMIN HARRISON HOPKINS.